US012064955B2

(12) United States Patent
Shibata

(10) Patent No.: US 12,064,955 B2
(45) Date of Patent: Aug. 20, 2024

(54) MEDIUM SUPPORTING MECHANISM AND PRINTING APPARATUS

(71) Applicant: SEIKO EPSON CORPORATION, Tokyo (JP)

(72) Inventor: Yohei Shibata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 93 days.

(21) Appl. No.: 18/058,396

(22) Filed: Nov. 23, 2022

(65) Prior Publication Data

US 2023/0166534 A1 Jun. 1, 2023

(30) Foreign Application Priority Data

Nov. 26, 2021 (JP) ................................ 2021-191793

(51) Int. Cl.

| | |
|---|---|
| ***B41J 11/00*** | (2006.01) |
| ***B41J 11/02*** | (2006.01) |
| ***B41J 11/057*** | (2006.01) |
| ***B41J 11/06*** | (2006.01) |
| ***B41J 15/04*** | (2006.01) |
| *B41J 2/01* | (2006.01) |

(52) U.S. Cl.

CPC .......... *B41J 11/0045* (2013.01); *B41J 11/005* (2013.01); *B41J 11/02* (2013.01); *B41J 11/057* (2013.01); *B41J 11/06* (2013.01); *B41J 15/04* (2013.01); *B41J 2/01* (2013.01); *B41J 11/0055* (2013.01); *B41J 15/046* (2013.01)

(58) Field of Classification Search

CPC ....... B41J 11/0045; B41J 11/005; B41J 11/02; B41J 11/057; B41J 11/06; B41J 15/04; B41J 2/01; B41J 11/0055; B41J 15/046

See application file for complete search history.

(56) References Cited

U.S. PATENT DOCUMENTS

| | | | | |
|---|---|---|---|---|
| 2014/0099149 A1* | 4/2014 | Kikura | .................. | B41J 15/046 400/619 |
| 2017/0021642 A1* | 1/2017 | Kitagishi | .................. | B41J 2/01 |
| 2019/0193435 A1* | 6/2019 | Washizawa | .......... | B41J 11/0025 |

FOREIGN PATENT DOCUMENTS

| | | |
|---|---|---|
| JP | 2019-162803 A | 9/2019 |
| JP | 2019162803 A * | 9/2019 |

* cited by examiner

*Primary Examiner* — Henok D Legesse

(74) *Attorney, Agent, or Firm* — WORKMAN NYDEGGER

(57) ABSTRACT

A medium supporting mechanism includes a medium supporting unit and a medium holding unit. The medium supporting unit includes a support face that supports a medium, a guide rail intersecting a transport direction in which the medium is transported, and an engaged portion positioned upstream of the first guide rail. The medium holding unit includes a holding portion that covers an edge of the medium in a width direction, an abutting portion movable between an abutting position and a separation position, a switching portion that switches a position of the abutting portion between the abutting position and the separation position, and an engaging portion engageable with the second guide rail. The medium holding unit includes a pressing portion downstream of the abutting portion in the transport direction. The pressing portion presses the support face to move a position of the holding portion in a direction away from the support face.

7 Claims, 9 Drawing Sheets

MEDIUM SUPPORTING MECHANISM AND PRINTING APPARATUS

The present application is based on, and claims priority from JP Application Serial Number 2021-191793, filed Nov. 26, 2021, the disclosure of which is hereby incorporated by reference herein in its entirety.

BACKGROUND

1. Technical Field

The present disclosure relates to a medium supporting mechanism that supports a transported medium and a printing apparatus.

2. Related Art

Hitherto, there has been known, as an example of a printing apparatus, an ink jet-type printing apparatus that performs printing on a medium by ejecting ink onto the medium supported on a medium support face. The ink jet-type printing apparatus includes a medium supporting mechanism in some cases. The medium supporting mechanism supports a medium so as to prevent the medium from floating from the medium support face during printing or transport of the medium. A medium supporting mechanism disclosed in JP-A-2019-162803 has a structure in which two grooves (rails) are provided in a platen to intersect a transport direction and an abutting portion provided to a sheet holding plate passes through the rails. The medium supporting mechanism has a structure in which, when an operating lever is gripped, a clearance is generated between the rails and the abutting portion and the sheet holding plate is freely movable along the rails.

However, in JP-A-2019-162803, when an ejection head extends in the transport direction of the medium for the purpose of increasing a printing speed, the sheet holding plate is also required to be elongated accordingly. Note that, when the sheet holding plate is elongated, a weight of the sheet holding plate is also increased. Thus, there arises a problem of degradation of usability such as operability of the sheet holding plate.

SUMMARY

A medium supporting mechanism includes a medium supporting unit, and a medium holding unit, wherein the medium supporting unit includes a support face supporting a medium, a guide rail being provided, at the support face, to extend along a width direction intersecting a transport direction in which the medium is transported, and an engaged portion being positioned upstream of the guide rail in the transport direction and intersecting the support face, the medium holding unit includes a holding portion covering an edge of the medium in the width direction, an abutting portion movable between an abutting position and a separation position, the abutting position being a position at which the abutting portion presses and abuts against the abutting surface being an inner wall of the guide rail, the separation position being a position at which the abutting portion is separated away from the abutting surface, a switching portion configured to switch a position of the abutting portion from one of the abutting position and the separation position to the other one thereof, and an engaging portion configured to engage with the engaged portion, and the medium holding unit further includes a pressing portion downstream of the abutting portion in the transport direction, the pressing portion being configured to press the support face to move a position of the holding portion in a direction away from the support face.

A printing apparatus includes a printing unit configured to perform printing on a medium, and a medium supporting mechanism configured to support the medium, wherein the medium supporting mechanism includes a medium supporting unit, and a medium holding unit, the medium supporting unit includes a support face supporting a medium, a guide rail being provided to extend along a width direction intersecting a transport direction in which the medium is transported, and an engaged portion being positioned upstream of the guide rail in the transport direction and intersecting the support face, the medium holding unit includes a holding portion covering an edge of the medium in the width direction, an abutting portion movable between an abutting position and a separation position, the abutting position being a position at which the abutting portion presses and abuts against the abutting surface being an inner wall of the guide rail, the separation position being a position at which the abutting portion is separated away from the abutting surface, a switching portion configured to switch a position of the abutting portion from one of the abutting position and the separation position to the other one thereof, and an engaging portion configured to engage with the engaged portion, and the medium holding unit further includes a pressing portion downstream of the abutting portion in the transport direction, the pressing portion being configured to press the support face to move a position of the holding portion in a direction away from the support face.

DESCRIPTION OF EXEMPLARY EMBODIMENTS

1. First Exemplary Embodiment

In the present exemplary embodiment, description is made on a printing apparatus 1 that performs printing on a medium M wound in a roll-like shape, as an example. The printing apparatus 1 according to the present exemplary embodiment is a Large Format Printer (LFP) used for printing on a poster, a signboard (a billboard, a direction board, and the like), a banner, a suspension screen, a tapestry, and the like.

For convenience of the description, an XYZ coordinate system is used for illustration in each of the drawings described below while placing the printing apparatus 1 on a horizontal plane as a reference. The X direction corresponds to a main scanning direction of an ejection head 43, and also corresponds to a width direction of the medium M on which printing is performed. A Y direction is orthogonal to the X direction on a horizontal plane including the X direction, and corresponds to a front-back direction of the printing apparatus 1. A Z direction corresponds to a direction orthogonal to the X direction and the Y direction, a vertical direction with respect to the horizontal plane including the X direction and the Y direction, and a height direction of the printing apparatus 1.

In the X direction, the left direction of the printing apparatus 1 corresponds to a +X direction, and the right direction thereof corresponds to a −X direction when a roll body R2 of the printing apparatus 1 is viewed from the front side. In the Y direction, the front direction of the printing apparatus 1 (the roll body R2 side) corresponds to a +Y direction, and the back direction (a roll body R1 side) thereof corresponds to a −Y direction. In the Z direction, the upper direction (including a top portion, a top surface, and the like) of the printing apparatus 1 corresponds to a +Z direction, and the lower direction (including a lower portion, a bottom surface, and the like) thereof corresponds to a −Z direction.

In each of the drawings described below, for convenience of the description and the illustration, an aspect ratio of each member may be illustrated differently from the actuality in some cases. Further, other components than components needed to be described may sometimes be omitted.

Figure 1:
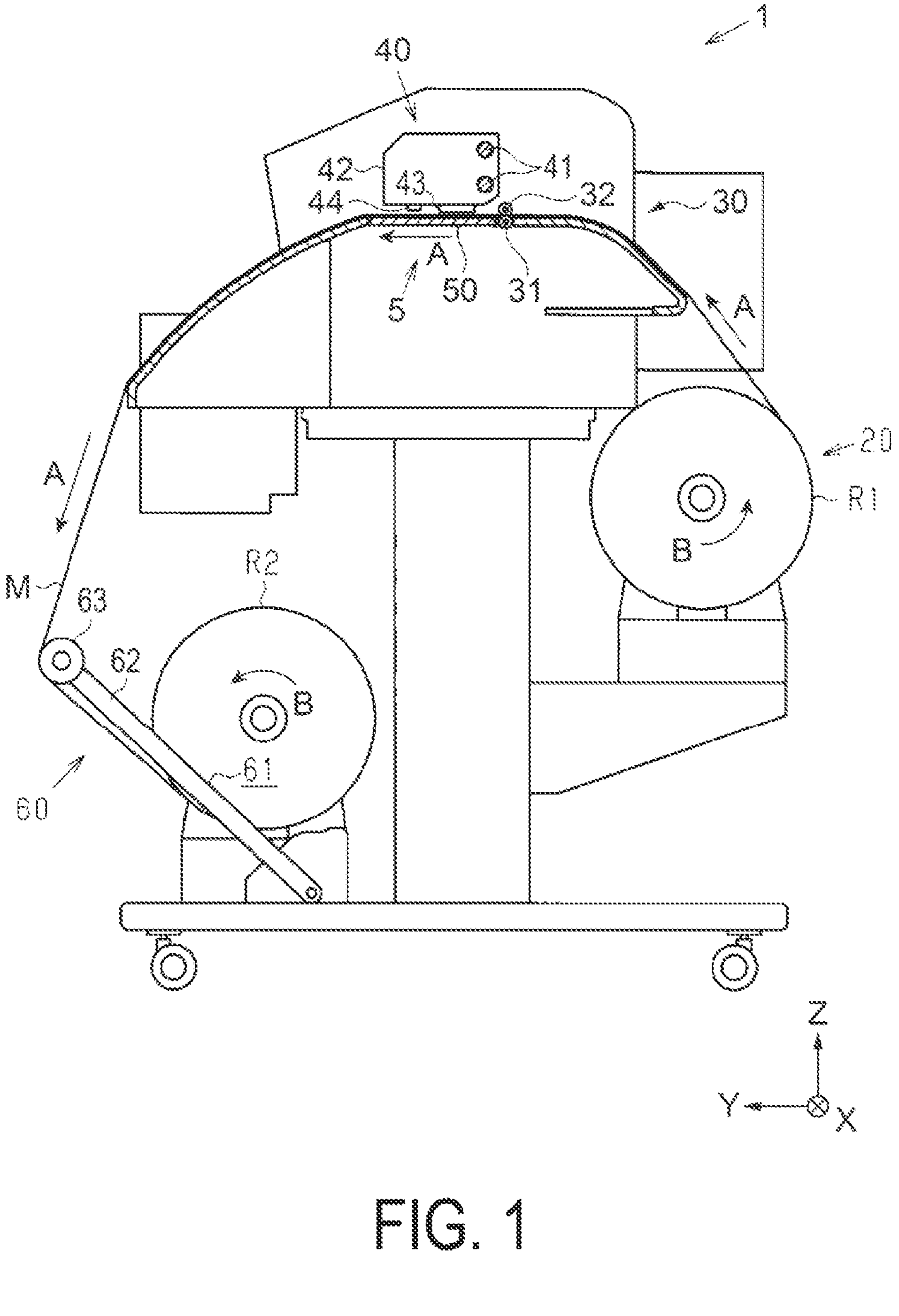
FIG. 1 is a schematic view illustrating an inner configuration of a printing apparatus according to a first exemplary embodiment.
Figure 2:
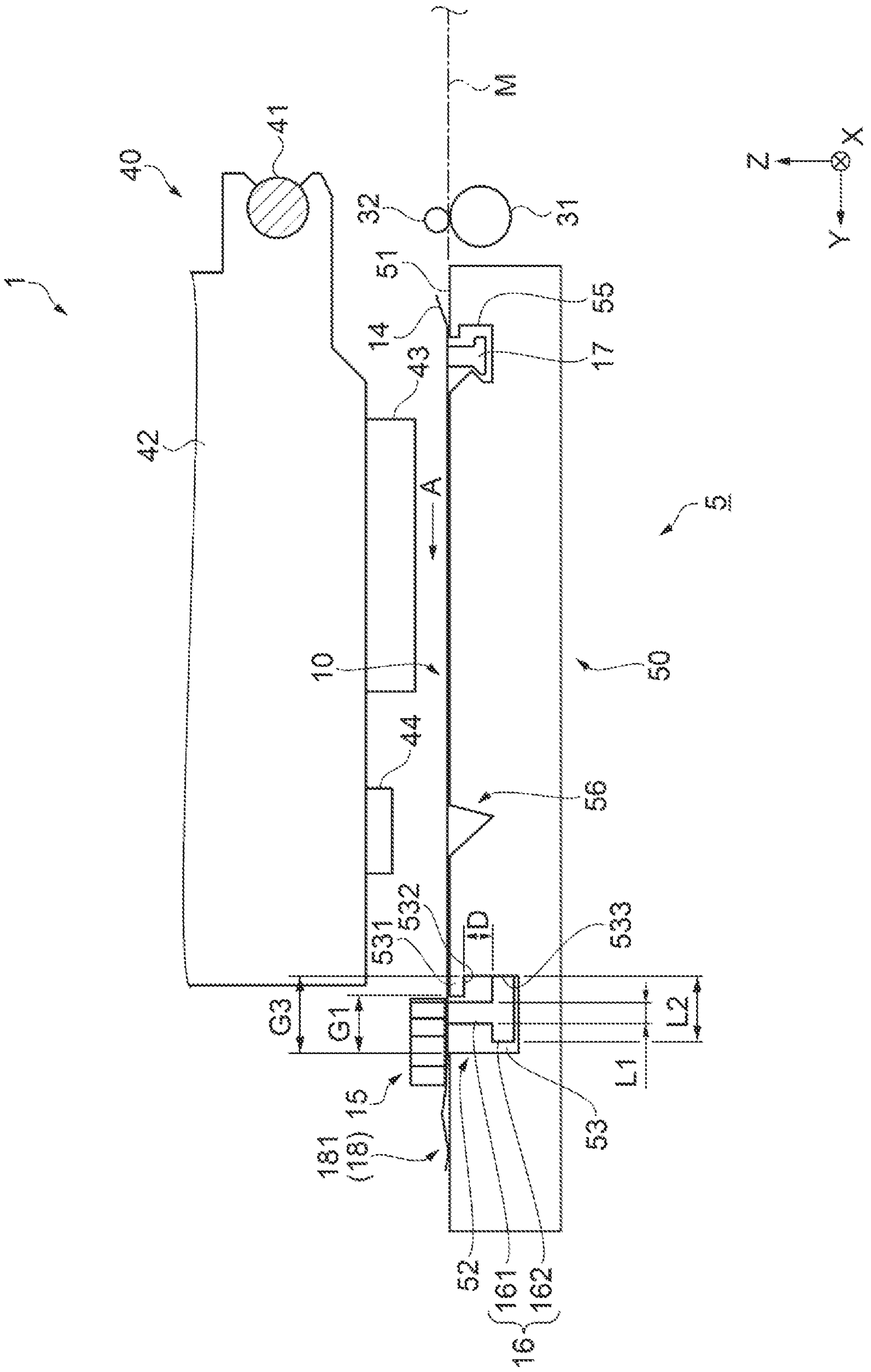
FIG. 2 is a cross-sectional view illustrating a medium supporting mechanism and a printing unit in an enlarged manner.
Figure 3:
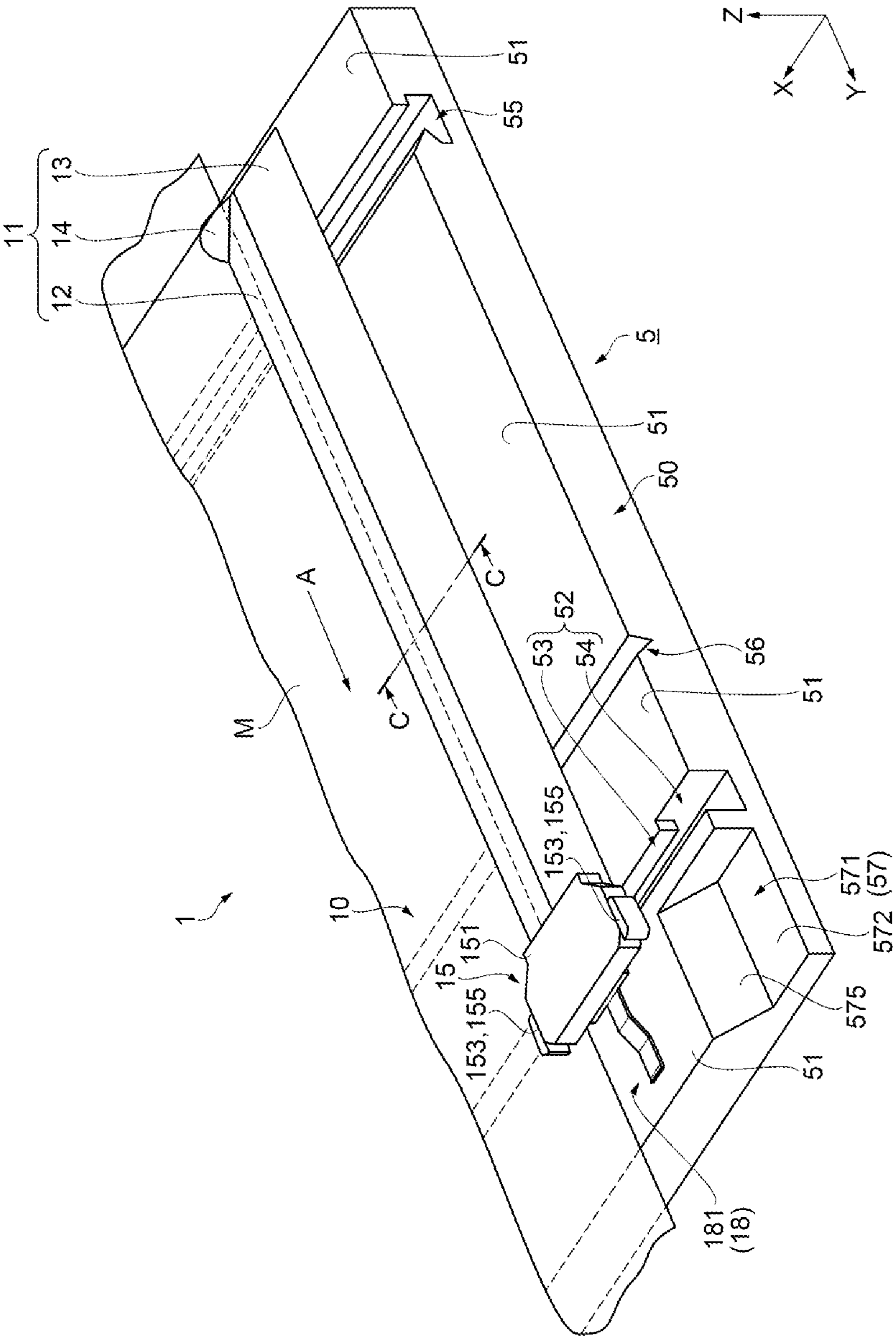
FIG. 3 is a perspective view illustrating a configuration of the medium supporting mechanism.

FIG. 1 is a schematic view illustrating an inner configuration of the printing apparatus 1 according to the present exemplary embodiment. FIG. 2 is a cross-sectional view illustrating a medium supporting mechanism 5 and a printing unit 40 in an enlarged manner. FIG. 3 is a perspective view illustrating a configuration of the medium supporting mechanism 5.

Next, with reference to FIG. 1 and FIG. 2, a configuration of the printing apparatus 1 is described.

As illustrated in FIG. 1, the printing apparatus 1 includes a roll-to-roll type transport unit 30 that transports the medium M, the medium supporting mechanism 5 that supports the medium M with respect to the printing unit 40, and the printing unit 40 that prints an image, a character, or the like by ejecting ink onto a predetermined region of the medium M, based on printing data.

The transport unit 30 includes a feeding unit 20 that feeds out the medium M in a roll shape to the printing unit 40, and a winding unit 60 that winds the fed medium M after printing in the printing unit 40. The transport unit 30 includes a transport roller 31 and driven rollers 32 that transport the medium M in a transport direction A in the middle of the transport path between the feeding unit 20 and the winding unit 60.

The transport roller 31 has a substantially cylindrical shape elongated in the X direction, and is driven by a driving motor (not illustrated) to rotate about the X direction as a rotation axis direction. The plurality of driven rollers 32 are aligned in the X direction at positions facing the transport roller 31, and press the medium M against the transport roller 31. The medium M is nipped between the transport roller 31 and the driven rollers 32, and is transported in the transport direction A (the +Y direction) as the transport roller 31 is driven to rotate.

The feeding unit 20 is arranged upstream of the transport roller 31. The feeding unit 20 holds the roll body R1 obtained by winding the medium M into a cylindrical shape. The roll body R1 is replaceably loaded to the feeding unit 20, and a width dimension and the number of winding times (length) of the medium M forming the roll body R1 may differ. The roll body R1 rotates in a rotation direction B by a driving force of a feeding motor (not illustrated). With this, the medium M is unwound from the roll body R1, and is fed to the printing unit 40. Note that, in the present exemplary embodiment, in the printing apparatus 1, a roll type medium is used as the medium M, but the present exemplary embodiment is not limited to the printing apparatus using such a roll type medium. For example, a cutform type medium may be used.

The winding unit 60 is arranged downstream of the transport roller 31. The winding unit 60 winds the medium M after printing in the printing unit 40, into a cylindrical shape. With this, the roll body R2 is formed. The winding unit 60 includes a tension application mechanism 61 that applies a tension to the medium M. The tension application mechanism 61 includes an arm member 62 that is supported in a freely swingable manner and a tension roller 63 that is supported by the distal end of the arm member 62 in a freely rotatable manner.

Under a state in which the tension application mechanism 61 presses the tension roller 63 against the medium M and applies a tension thereto, a core member rotates in the rotation direction B by a driving force of a winding motor (not illustrated). With this, the medium M is wound around the core member, and thus forms the roll body R2. Note that, in the printing apparatus 1 according to the present exemplary embodiment, the medium M may be discharged without winding. For example, the medium M after printing may be accommodated in a discharge basket (not illustrated) that is attached in place of the winding unit 60.

The printing unit 40 includes a pair of guide shafts 41 that extends along the X direction, the carriage 42 that is supported by the guide shafts 41, the ejection head 43 that ejects ink onto the medium M, and an optical sensor 44 that detects the width of the medium M.

The carriage 42 reciprocates in the X direction along the guide shafts 41 by driving of a carriage motor (not illustrated). The ejection head 43 is provided at a lower part of the carriage 42 so as to face the medium M transported on a medium supporting unit 50. The ejection head 43 according to the present exemplary embodiment is an ink-jet head of a serial head type, and includes nozzle rows (not illustrated) corresponding to a plurality of colors. For example, the ejection head 43 includes nozzle rows corresponding to four colors, that are cyan, yellow, magenta, and black.

With the configuration described above, the ejection head 43 is capable of performing printing by ejecting ink being a liquid from nozzles (not illustrated) onto the transported medium M while reciprocating in the main scanning direction that intersects the transport direction A of the medium M. In the printing apparatus 1 thus configured, an image or a character is printed on the medium M by repeating sub scanning and main scanning in an alternating manner. During the sub scanning, the medium M is drawn out from the roll body R1 by a predetermined amount, and is intermittently transported in the transport direction A by the transport roller 31 and the driven rollers 32. During the main scanning, the ejection head 43 reciprocates in the X direction while ejecting ink onto the medium M under a state in which the medium M that is transported by a predetermined amount is stopped.

As illustrated in FIG. 2, the optical sensor 44 is provided at a lower part of the carriage 42 so as to face a detection groove 56 of the medium supporting unit 50. The optical sensor 44 detects presence or absence of the medium M on the detection groove 56, based on a difference between intensity of reflection light when the medium M is irradiated with light and intensity of reflection light when the detection groove 56 is irradiated with light. With this, a control unit, which is not illustrated, detects a position of an edge of the medium M in the width direction.

With reference to FIG. 2 and FIG. 3, a configuration of the medium supporting mechanism 5 is described.

As illustrated in FIG. 2 and FIG. 3, the medium supporting mechanism 5 includes the medium supporting unit 50 that supports, from below, the medium M transported by the transport unit 30 and a medium holding unit 10 that engages with the medium supporting unit 50. The medium supporting unit 50 has a substantially rectangular plate-like shape extending in the X direction and the Y direction. A surface of the medium supporting unit 50 that faces the printing unit 40 is a support face 51 that is held in contact with a back surface of the medium M, which is on a side opposite to a printing surface thereof, and supports the medium M.

A first guide rail 52 is formed in the support face 51 of the medium supporting unit 50. The first guide rail 52 functions as a guide rail that intersects the transport direction A in which the medium M is transported and is provided to extend along the width direction. A second guide rail 55 is formed in the support face 51. The second guide rail 55 functions as an engaged portion that is positioned upstream of the first guide rail 52 in the transport direction A and intersects the support face 51. Note that the second guide rail 55 is formed to have a groove-like shape. The first guide rail 52 and the second guide rail 55 are formed to be parallel to each other. Further, the detection groove 56 that is parallel to the first guide rail 52 and the second guide rail 55 is formed between the first guide rail 52 and the second guide rail 55.

As illustrated in FIG. 3, the first guide rail 52 has a first groove 53 and a second groove 54. The first groove 53 is a groove for moving the medium holding unit 10 so that the medium holding unit 10 is aligned with an edge of the medium M in the width direction. The second groove 54 is a groove for inserting an abutting portion 16 of the medium holding unit 10 from above into the first groove 53. Note that the second groove 54 is formed to be continuous to an end of the first groove 53 in the width direction.

Figure 5:
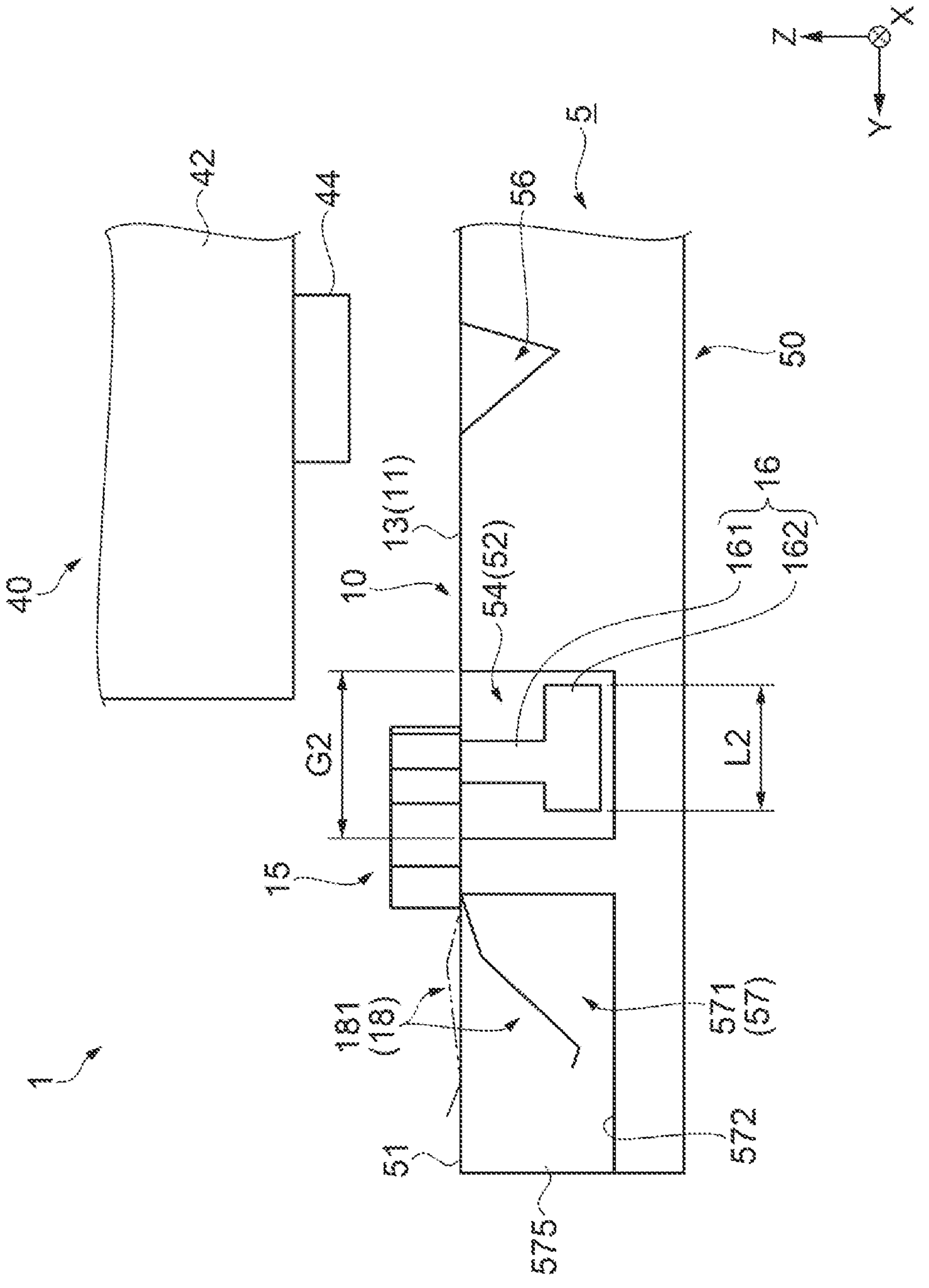
FIG. 5 is a side view illustrating a second groove and an accommodating portion.

As illustrated in FIG. 3, in plan view of the support face 51, the support face 51 is provided with an accommodating portion 57 in the vicinity of downstream of the second groove 54. In the present exemplary embodiment, the accommodating portion 57 is formed as a recessed portion 571 having a bottom surface portion 572 further recessed from the support face 51. When the abutting portion 16 of the medium holding unit 10 is inserted from above into the second groove 54, the accommodating portion 57 accommodates a pressing portion 18 of the medium holding unit 10, which is described later. Note that, in the present exemplary embodiment, the term "accommodate" indicates that, as illustrated in FIG. 5 described later, the pressing portion 18 is positioned in an original shape not exerting a pressing force while avoiding abutting against the support face 51.

In FIG. 3, the second groove 54 and the accommodating portion 57 are provided to an end of the medium supporting unit 50 in the −X direction. However, in the present exemplary embodiment, the second groove 54 and the accommodating portion 57 are also provided to an end of the medium supporting unit 50 in the +X direction in a symmetric manner with the Y-axis as a center. The second groove 54 and the accommodating portion 57 in the present exemplary embodiment are formed on an outer side of a region in the width direction (the X direction), the region where the edge of the medium M is transported.

As illustrated in FIG. 2 and FIG. 3, the medium holding unit 10 includes a holding portion 11, a switching portion 15, the abutting portion 16, an engaging portion 17, and the pressing portion 18.

The holding portion 11 is a constituent portion that holds the medium M on the support face 51. The switching portion 15 is a constituent portion that switches a position of the abutting portion 16 between an abutting position and a separation position that are described later. The abutting portion 16 is a constituent portion that engages with the first guide rail 52. The engaging portion 17 is a constituent portion that is engageable with the second guide rail 55. The pressing portion 18 is a constituent portion that presses the support face 51 so that a position of the holding portion 11 moves in a direction away from the support face 51 (moves upward).

As illustrated in FIG. 3, in the medium holding unit 10, the holding portion 11 has a rectangular shape elongated in the transport direction A, and the switching portion 15 is attached to a downstream end of the holding portion 11. The pressing portion 18 is provided downstream of the switching portion 15. As illustrated in FIG. 3, the holding portion 11 includes a covering portion 12 that covers a side edge part being the edge of the medium M in the width direction (the X direction), a base plate portion 13 that is held in contact with (abuts against) the support face 51 of the medium supporting unit 50, and a guiding portion 14 that is obtained by inclining a corner portion of an upstream side end of the covering portion 12 obliquely upward. Note that, in the present exemplary embodiment, the pressing portion 18 is formed to be continuous to a downstream end of the base plate portion 13. The pressing portion 18 and the base plate portion 13 may be formed as separate portions, and may be formed of different materials.

Figure 4:
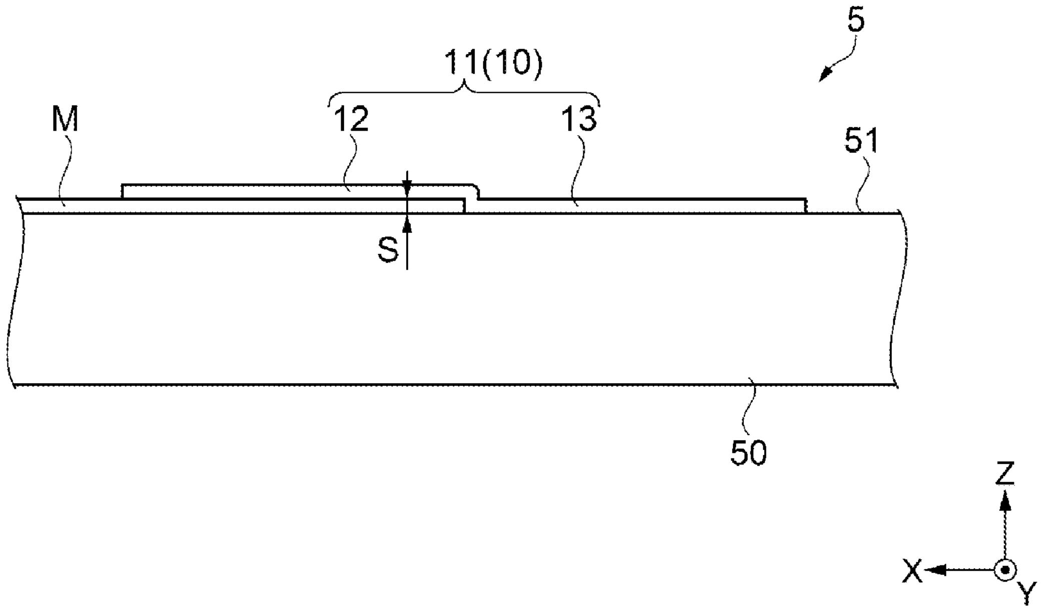
FIG. 4 is a cross-sectional view illustrating a holding portion.

FIG. 4 is a cross-sectional view illustrating the holding portion 11. Specifically, FIG. 4 is a cross-sectional view taken along the line C-C in FIG. 3.

With reference to FIG. 4, the holding portion 11 is described.

As illustrated in FIG. 4, the covering portion 12 is provided with a space S in which the medium M is sandwiched between the covering portion 12 and the support face 51, and extends from one longitudinal side of the base plate portion 13 in the width direction of the medium M. Further, the guiding portion 14 guides the side edge part of the medium M, which is transported in the transport direction A, into the space S between the covering portion 12 and the support face 51. The holding portion 11 including the pressing portion 18 is formed by subjecting a metal plate to punching processing or bending processing. The space S is formed by subjecting the covering portion 12 and the base plate portion 13 to so-called Z-shape bending (step-bending) processing or the like.

As illustrated in FIG. 2, in the lower direction of the switching portion 15, the abutting portion 16 is formed to protrude in the lower direction from the base plate portion 13 of the holding portion 11. The abutting portion 16 has a base 161 and the tip portion 162 continuous to the base 161 in the lower direction. In plan view in the X direction, the abutting portion 16 has a cross section having a substantially inverted T-like shape. Specifically, in the abutting portion 16, a first length L1 of the base 161 in the transport direction A is formed to be shorter than a second length L2 of the tip portion 162 in the transport direction A.

In plan view of the support face 51 as illustrated in FIG. 3, specifically, as illustrated in FIG. 2, the first groove 53 of the first guide rail 52 is formed to have a gap G1, which is longer than the first length L1 of the base 161 and is shorter than the second length L2 of the tip portion 162 in the transport direction A, in a region on the support face 51 side.

As illustrated in FIG. 2, in the lower direction of the region corresponding to the gap G1, which is on the support face 51 side, in the transport direction A, the first groove 53 has a region corresponding to a gap G3 longer than the second length L2 of the tip portion 162. As described above, in plan view in the width direction (in plan view in the X direction), the first groove 53 forms a substantially L-shaped groove.

As illustrated in FIG. 2, in plan view in the width direction (in plan view in the X direction), the first groove 53 has a regulation portion 531 for preventing the tip portion 162 from coming off the first guide rail 52. Specifically, in the present exemplary embodiment, as illustrated in FIG. 2, a region being a difference between the region corresponding to the gap G3 in the lower direction of the support face 51 side and the region corresponding to the gap G1 on the support face 51 side functions as the regulation portion 531 in the first groove 53.

FIG. 5 is a side view illustrating the second groove 54 and the accommodating portion 57. Note that FIG. 5 is also a cross-sectional view illustrating an operation in a case that the abutting portion 16 is provided in the second groove 54.

Specifically, as illustrated in FIG. 5, in plan view of the support face 51, the second groove 54 is formed to have a gap G2 longer than the second length L2 of the tip portion 162 in the transport direction A. As illustrated in FIG. 5, the second groove 54 forms a groove having a rectangular cross section. In the present exemplary embodiment, the cross-sectional shape of the second groove 54 matches with a shape obtained by removing the regulation portion 531 of the first groove 53. Thus, the dimension of the gap G3 of the first groove 53 in the lower direction of the support face 51 side and the dimension of the gap G2 of the second groove 54 match with each other.

Figure 6:
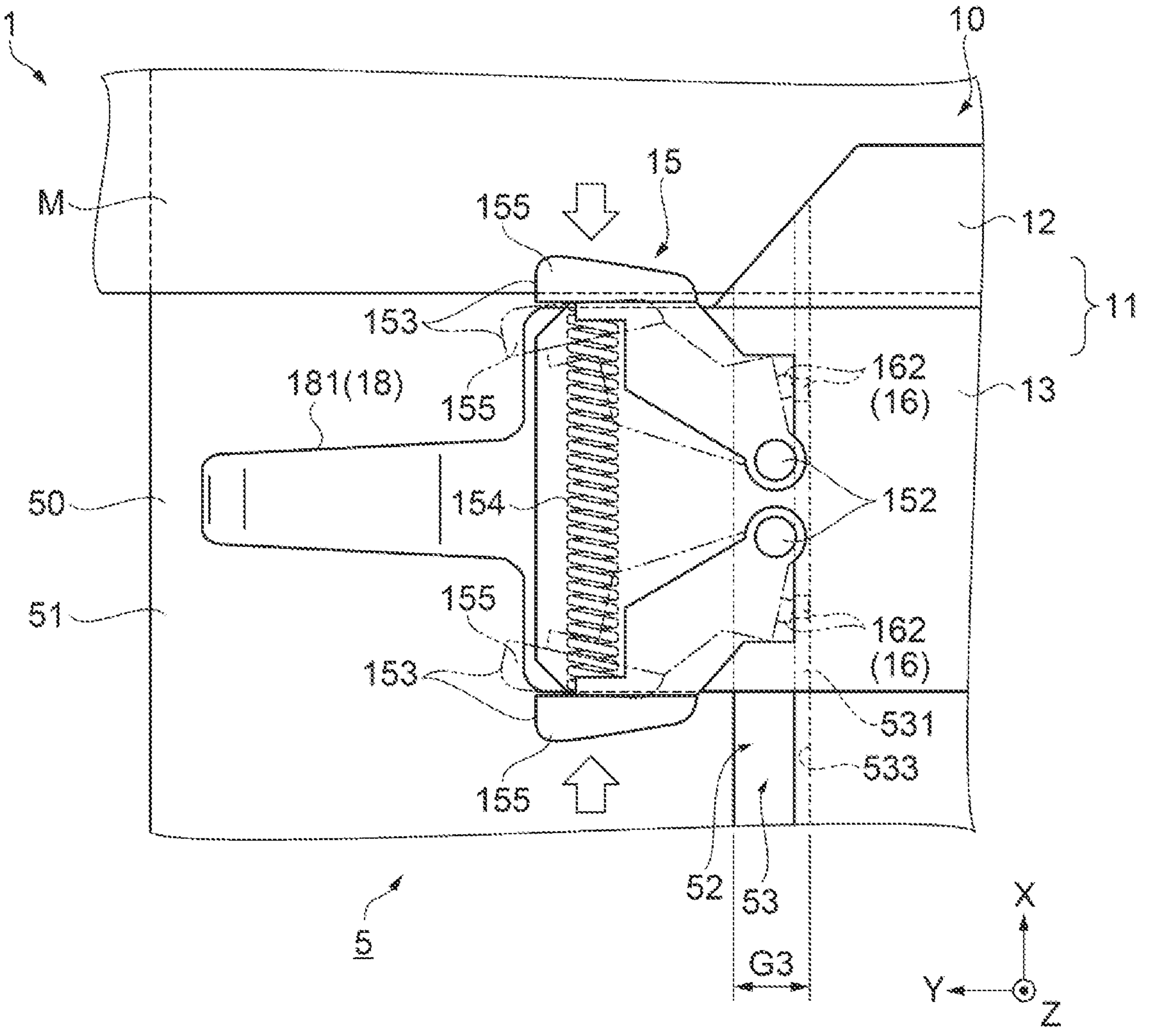
FIG. 6 is a plan view illustrating a configuration of a switching portion.

FIG. 6 is a plan view illustrating a configuration of the switching portion 15. In FIG. 6, the switching portion 15 provided in the first groove 53 of the first guide rail 52 is viewed from above. In FIG. 6, illustration is given while removing a lid 151 (see FIG. 3) that covers an upper part of the switching portion 15. In FIG. 6, directions in which the levers 153 move are indicated with the arrows, and positions after the movement of the levers 153 and the abutting portion 16 (the tip portion 162) are indicated with the two-dot chain lines. FIG. 6 illustrates a state in which a leaf spring 181 forming the pressing portion 18 presses the support face 51 from above.

Next, with reference to FIG. 6, a configuration of the switching portion 15 is described.

The switching portion 15 mainly includes the lid 151 that covers the upper part, the pair of levers 153 each having a base end supported by a turning shaft 152 in a turnable manner, and a coil spring 154 as an elastic member. Note that the abutting portion 16 is coupled to the base ends of the levers 153, and hence is coupled to the levers 153. The levers 153 and the abutting portion 16 are formed of the same member such as a hard resin. As illustrated in FIG. 3, the levers 153 are provided in the upper direction of the holding portion 11. As illustrated in FIG. 2, the abutting portion 16 is provided in the lower direction of the holding portion 11.

The pair of levers 153 are provided. Each of the levers 153 is a turning lever that has a base end supported by corresponding one of the pair of turning shafts 152 in a turnable manner and that has an abutting portion extending downstream from the turning shaft 152. The switching portion 15 includes the coil spring 154 that is engaged with the levers 153. Both the ends of the coil spring 154 are engaged with inner surfaces facing each other in the vicinity of the distal ends of the levers 153. An elastic force of the coil spring 154 causes the space between the abutting portions of the pair of levers 153 to expand in the X direction. Grippers 155 are provided on the outer surfaces in the vicinity of the distal ends of the levers 153. A user grips the grippers 155 to narrow the space between the abutting portions of the levers 153 in the X-axis direction.

The abutting portion 16 is positioned substantially in the +X direction and the −X direction with respect to the turning shafts 152. Thus, when the coil spring 154 expands the space between the abutting portions of the pair of levers 153 in the X-axis direction, the abutting portion 16 (the tip portion 162) abuts against and presses an abutting surface 533 being an inner surface of the first groove 53 in the −Y direction in the region corresponding to the gap G3. Note that the abutting surface 533 is an inner wall of the first guide rail 52. With this, although the details thereof are described later, a position of the medium holding unit 10 is fixed, and the space S between the covering portion 12 and the support face 51 that support the medium M is fixed.

A pressing force with which the abutting portion 16 (the tip portion 162) abuts against and presses the abutting surface 533 in the −Y direction is larger than a pressing force generated when the support face 51 is pressed from above by a spring force of the leaf spring 181 forming the pressing portion 18. Thus, when the tip portion 162 is fixed by the abutting surface 533, the medium holding unit 10 does not float from the support face 51 due to the pressing force of the leaf spring 181. Specifically, in the present exemplary embodiment, an elastic force of the coil spring 154 of the switching portion 15 is set to be larger than a spring force (pressing force) of the leaf spring 181. Thus, when the tip portion 162 is fixed by the abutting surface 533, the medium holding unit 10 does not float from the support face 51 due to the pressing force of the leaf spring 181.

Meanwhile, when the pair of levers 153 are gripped by a user, and are turned so as to narrow the space therebetween in the X-axis direction being the direction indicated with the arrows in FIG. 6, the abutting portion 16 is away from the abutting surface 533. Specifically, when a user applies a force to the levers 153 to narrow the space therebetween in the X-axis direction, the abutting portion 16 presses the abutting surface 533 to release fixation of the medium holding unit 10. Thus, due to a pressing force with which the leaf spring 181 presses the support face 51 from above, the medium holding unit 10 moves upward. Note that, in this case, a user presses the levers 153 downward with a force against the pressing force of the leaf spring 181, and thus the medium holding unit 10 moves downward.

Note that, in the following description, a position at which the abutting portion 16 (the tip portion 162) presses and abuts against the abutting surface 533 is referred to as the abutting position. In contrast, a position at which the abutting portion 16 (the tip portion 162) is away from the abutting surface 533 is referred to as the separation position. In the switching portion 15, when a user narrows the space between the levers 153 in the arrow directions, the abutting portion 16 is at the separation position. When gripping of the levers 153 is stopped, the abutting portion 16 is at the abutting position. Thus, the switching portion 15 performs an operation for switching a position of the abutting portion 16 from one of the abutting position and the separation position to the other one.

With reference to FIG. 3 and FIG. 5, description is made on a method of providing the medium holding unit 10 to the medium supporting unit 50. Note that the medium holding unit 10 is required to be installed at each of both the ends of the medium supporting unit 50 in the X direction, but a provision method for the both is similarly performed, and hence description is made on one medium holding unit 10 (at the end of the medium supporting unit 50 in the −X direction), as illustrated in FIG. 3.

As illustrated in FIG. 3, firstly, a user inserts the engaging portion 17 of the medium holding unit 10 from above into the groove in the end of the second guide rail 55 of the medium supporting unit 50 in the −X direction. In the present exemplary embodiment, the cross-sectional shape of the groove of the second guide rail 55 is formed to have an irregular shape with a recess and a protrusion. However, the second guide rail 55 is formed to establish a space relationship that enables insertion of the engaging portion 17 from above into the groove. After insertion of the engaging portion 17, the second guide rail 55 is uneasy for the engaging portion 17 to come off.

Next, as illustrated in FIG. 5, a user inserts the abutting portion 16 from above into the second groove 54 of the first guide rail 52. At this state, a user performs the insertion while gripping the grippers 155 so as to narrow the space therebetween. As illustrated in FIG. 5, with this operation, at the same time, the leaf spring 181 forming the pressing portion 18 is positioned in the recessed portion 571 being the accommodating portion 57. With this, positioning can be performed without pressing the support face 51 under a free state of floating or a state having an initial shape. Thus, the abutting portion 16 can be inserted more easily into the second groove 54.

Next, while gripping the grippers 155 so as to narrow the space therebetween and pressing the grippers 155 downward, a user moves the abutting portion 16, which is inserted into the second groove 54, in the +X direction being a direction of the first groove 53. At this state, along with the movement of the grippers 155 (the switching portion 15), the base plate portion 13 moves while sliding on the support face 51, and the engaging portion 17 moves in the second guide rail 55 in the +X direction.

Here, as illustrated in FIG. 3 and FIG. 5, a movement assisting surface portion 575 is formed on an inner surface of the accommodating portion 57 (the recessed portion 571) in the +X direction. The movement assisting surface portion 575 is gradually inclined upward in the +X direction toward the support face 51 in the +X direction. Thus, when the abutting portion 16 moves in the +X direction being a direction of the first groove 53, the leaf spring 181 abuts against the movement assisting surface portion 575. After that, the leaf spring 181 slides along the movement assisting surface portion 575, and arrives at the support face 51. In this case, a pressing force of the leaf spring 181 is gradually increased. However, the movement assisting surface portion 575, which is inclined, enables the leaf spring 181 to move while avoiding a sudden increase of the pressing force.

After the abutting portion 16 moves in the first groove 53, downward pressing of the grippers 155 is stopped, and the space between the grippers 155 is narrowed. With this, the medium holding unit 10 can move. In this case, the medium holding unit 10 moves in the direction away from the support face 51. Thus, under this state, sliding friction between the base plate portion 13 and the support face 51 can be reduced, and thus movability can be achieved. Further, at the position on the support face 51 at which the holding portion 11 covers the edge of the medium M, the grippers 155 are pressed downward again, and gripping of the grippers 155, which are gripped in the direction of narrowing the space therebetween, is stopped. With this, the medium holding unit 10 can be provided to the medium supporting unit 50.

Note that, as illustrated in FIG. 2, when gripping of the grippers 155 is stopped, the abutting portion 16 is at the abutting position in the first groove 53. Specifically, when the abutting portion 16 is at the abutting position, the engaging portion 17 abuts against and presses the inner surface of the second guide rail 55 in the +Y direction, and thus sandwiches the medium supporting unit 50 in the Y direction. With this, a position of the medium holding unit 10 is fixed. At this state, as indicated with the solid line in FIG. 2 or with the two-dot chain line in FIG. 5, the leaf spring 181 retains the position in the height direction at which the leaf spring 181 is pressed against the support face 51.

Figure 7:
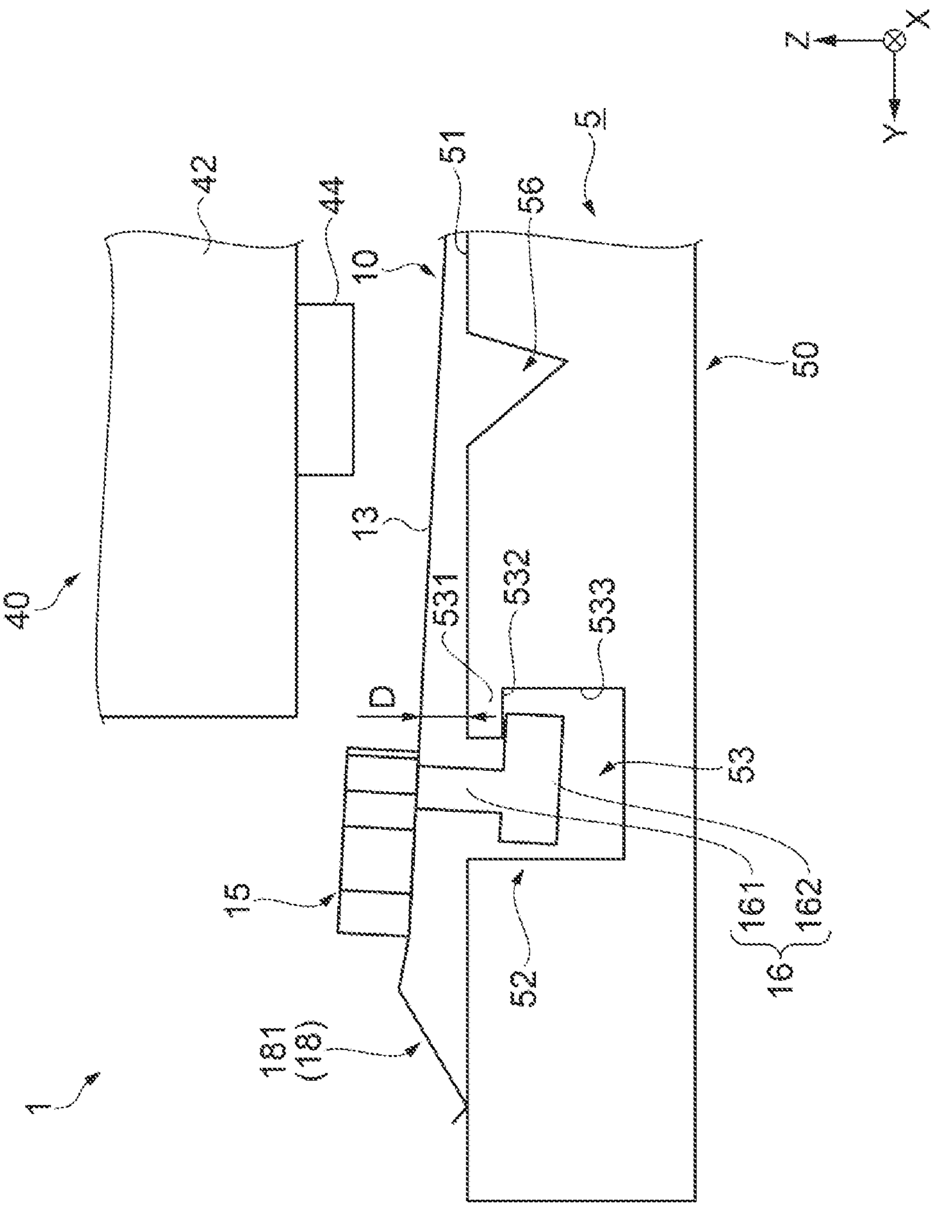
FIG. 7 is a cross-sectional view illustrating an operation of a medium holding unit when the medium holding unit moves.

FIG. 7 is a cross-sectional view illustrating an operation of the medium holding unit 10 when the medium holding unit 10 moves.

Hereinafter, with reference to FIG. 2 and FIG. 7, description is made on an operation when the medium holding unit 10 moves from a state in which, as illustrated in FIG. 2, the medium holding unit 10 is provided at a predetermined position (a position at which the medium holding unit 10 nips the edge of the medium M with the covering portion 12).

As illustrated in FIG. 2, when the medium holding unit 10 moves from a state in which the medium holding unit 10 is provided at a predetermined position, a user first grips the grippers 155 of the switching portion 15 so as to narrow the space therebetween. When the grippers 155 are gripped so as to narrow the space therebetween, the abutting portion 16 loses a pressing force in the −Y direction, and the end surface of the tip portion 162 in the −Y direction separates away from the abutting surface 533. In other words, the abutting portion 16 is switched from the abutting position to the separation position. Then, the medium holding unit 10 moves upward due to a pressing force of the leaf spring 181 that presses the support face 51 from above. Here, a part at which the engaging portion 17 abuts against the second guide rail 55 substantially functions as a fulcrum.

In this case, as illustrated in FIG. 7, due to a pressing force of the leaf spring 181, the medium holding unit 10 autonomously moves a position of the medium holding unit 10 in a direction away from the support face 51 (upward). Further, the abutting portion 16 (the tip portion 162) abuts against the regulation portion 531 (the lower end surface 532), and hence upward movement is regulated. Thus, there is no need for a user to lift the medium holding unit 10 including the grippers 155 upward so as to reduce a contact area of the base plate portion 13 and the support face 51 for the purpose of reducing sliding friction generated at the time of movement of the medium holding unit 10.

Note that, as illustrated in FIG. 2, when the abutting portion 16 is at the abutting position, there is a space corresponding to a distance D between the upper surface of the tip portion 162 and the lower end surface 532 of the regulation portion 531. Further, as illustrated in FIG. 7, the abutting portion 16 (the tip portion 162) is at the separation position, moves upward, and abuts against the regulation portion 531 (the lower end surface 532). With this, room (space) substantially corresponding the distance D is secured between the support face 51 being an upper part of the regulation portion 531 and the base plate portion 13 of the holding portion 11.

Note that, in a case in which the distance between the support face 51 being an upper part of the regulation portion 531 and the base plate portion 13 of the holding portion 11 substantially corresponds to the distance D, even when the covering portion 12 and the base plate portion 13 that face the ejection head 43 move upward from the support face 51, the covering portion 12 and the base plate portion 13 do not abut against the nozzles of the ejection head 43, and the gap is secured therebetween.

As illustrated in FIG. 2, in the present exemplary embodiment, the switching portion 15 is positioned downstream of the printing unit 40 (the carriage 42) in the transport direction A. Thus, when the medium holding unit 10 moves upward, contact with the printing unit 40 can be prevented.

Next, as illustrated in FIG. 7, under a state in which a position of the medium holding unit 10 is autonomously away from the support face 51, a user grips and moves the grippers 155 in the width direction (the X direction). With this, the medium holding unit 10 can smoothly move along the first guide rail 52 and the second guide rail 55.

According to the present exemplary embodiment, the following effects can be obtained.

The medium supporting mechanism 5 according to the present exemplary embodiment includes the medium supporting unit 50 and the medium holding unit 10. The medium supporting unit 50 includes the support face 51 that supports the medium M, the first guide rail 52 that is provided, on the support face 51, to extend along the width direction (the X direction) intersecting the transport direction A in which the medium M is transported, and the second guide rail 55 being an engaged portion that is positioned upstream of the first guide rail 52 in the transport direction A and intersects the support face 51. The medium holding unit 10 includes the holding portion 11 that covers the edge of the medium M in the width direction, the abutting portion 16 that is movable between the abutting position and the separation position separated away from the abutting surface 533, the abutting position being a position at which the abutting portion 16 presses and abuts against the abutting surface 533 being an inner wall of the first guide rail 52, the switching portion 15 that switches a position of the abutting portion 16 from one of the abutting position and the separation position to the other, and the engaging portion 17 that is engageable with the second guide rail 55 being an engaged portion. Further, the medium holding unit 10 includes the pressing portion 18 (the leaf spring 181) downstream of the abutting portion 16 in the transport direction A. The pressing portion 18 (the leaf spring 181) presses the support face 51, and moves a position of the holding portion 11 in a direction away from the support face 51.

With this configuration, in the medium supporting mechanism 5, when the abutting portion 16 moves to the separation position due to the switching portion 15, the pressing portion 18 (the leaf spring 181) presses the support face 51. With this, the position of the holding portion 11 autonomously moves in a direction away from the support face 51. Thus, sliding friction between the holding portion 11 (the base plate portion 13) and the support face 51 can be reduced. With this, a wrench between the first guide rail 52 and the abutting portion 16 can be suppressed. Thus, operability of the medium supporting mechanism 5 can be improved. Thus, usability such as operability of the medium supporting mechanism 5 can be improved.

In the medium supporting mechanism 5 according to the present exemplary embodiment, the pressing portion 18 is formed of the leaf spring 181.

With this configuration, since the pressing portion 18 is formed of the leaf spring 181, the position of the holding portion 11 can autonomously moves, due to a spring force exerted by the leaf spring 181, in a direction away from the support face 51 in the medium supporting mechanism 5 when the abutting portion 16 is at the separation position. Note that the pressing portion 18 is formed of the leaf spring 181, which facilitates formation of the pressing portion 18.

In the present exemplary embodiment, the abutting portion 16 has the base 161 coupled to the holding portion 11 and the tip portion 162 continuous to the base 161. In the abutting portion 16, the first length L1 of the base 161 in the transport direction A is shorter than the second length L2 of the tip portion 162 in the transport direction A. In plan view of the support face 51, the first guide rail 52 has the gap G1 that is longer than the first length L1 and shorter than the second length L2, and has the first groove 53 that guides the abutting portion 16 in a movable manner in the width direction. In plan view of the support face 51, the first guide rail 52 has the gap G2 that is continuous to the first groove 53 in the width direction and is longer than the second length L2, and has the second groove 54 for inserting and providing the abutting portion 16. Further, in plan view in the width direction, the first groove 53 has the regulation portion 531 that prevents the tip portion 162 from coming off the first guide rail 52. The second groove 54 is formed on the outer side of the region in the width direction, the region where the edge of the medium M is transported.

With this configuration, in the medium supporting mechanism 5, the gap G1 of the first groove 53 is shorter than the second length L2 of the tip portion 162. Thus, it is difficult to insert the abutting portion 16 into the first groove 53 from above. The medium holding unit 10 includes the pressing portion 18, and hence it is also difficult to insert the abutting portion 16 from the end surface of the first groove 53 in the width direction. However, the first guide rail 52 has the second groove 54 formed as the gap G2 larger than the second length L2 of the tip portion 162 of the abutting portion 16 in the transport direction A. Thus, when the abutting portion 16 is inserted into the second groove 54 from above, the abutting portion 16 can be provided in the first groove 53 in an indirect manner. Thus, a setting property of the holding portion 11 with respect to the medium supporting unit 50 can be improved. The second groove 54 is formed on the outer side of the region in the width direction, the region where the edge of the medium M is transported. With this, the medium holding unit 10 including the holding portion 11 may be removably mounted to the medium supporting unit 50 while the medium M is placed on the support face 51. Thus, operability of the medium holding unit 10 with respect to the medium supporting unit 50 is improved.

In the medium supporting mechanism 5 according to the present exemplary embodiment, the medium supporting unit 50 is provided with the recessed portion 571 being the accommodating portion 57 that accommodates the pressing portion 18.

With this configuration, the bottom surface portion 572 of the recessed portion 571 being the accommodating portion 57 is recessed with respect to the support face 51, and the leaf spring 181 is formed to establish a height relationship that prevents contact with the bottom surface portion 572. Thus, when the pressing portion 18 is positioned in the recessed portion 571 being the accommodating portion 57, the pressing portion 18 can be positioned at an initial state without exerting a pressing force while being prevented from abutting against the support face 51. Thus, even when the medium holding unit 10 includes the pressing portion 18 (the leaf spring 181), the pressing portion 18 is positioned in the recessed portion 571. With this, a setting property of the medium holding unit 10 with respect to the medium supporting unit 50 can be improved.

The printing apparatus 1 according to the present exemplary embodiment includes the printing unit 40 that performs printing on the medium M and the medium supporting mechanism 5 that supports the medium M. The medium supporting mechanism 5 includes the medium supporting unit 50 and the medium holding unit 10. The medium supporting unit 50 includes the support face 51, the first guide rail 52, and the second guide rail 55 being an engaged portion. The medium holding unit 10 includes the holding portion 11, the abutting portion 16, the switching portion 15, and the engaging portion 17. The medium holding unit 10 includes the pressing portion 18 (the leaf spring 181) downstream of the abutting portion 16 in the transport direction A. The pressing portion 18 (the leaf spring 181) presses the support face 51, and moves a position of the holding portion 11 in a direction away from the support face 51.

With this configuration, the printing apparatus 1 including the medium supporting mechanism 5 that suppresses a wrench between the first guide rail 52 and the abutting portion 16 and improves usability such as operability can be achieved.

2. Second Exemplary Embodiment

Figure 8:
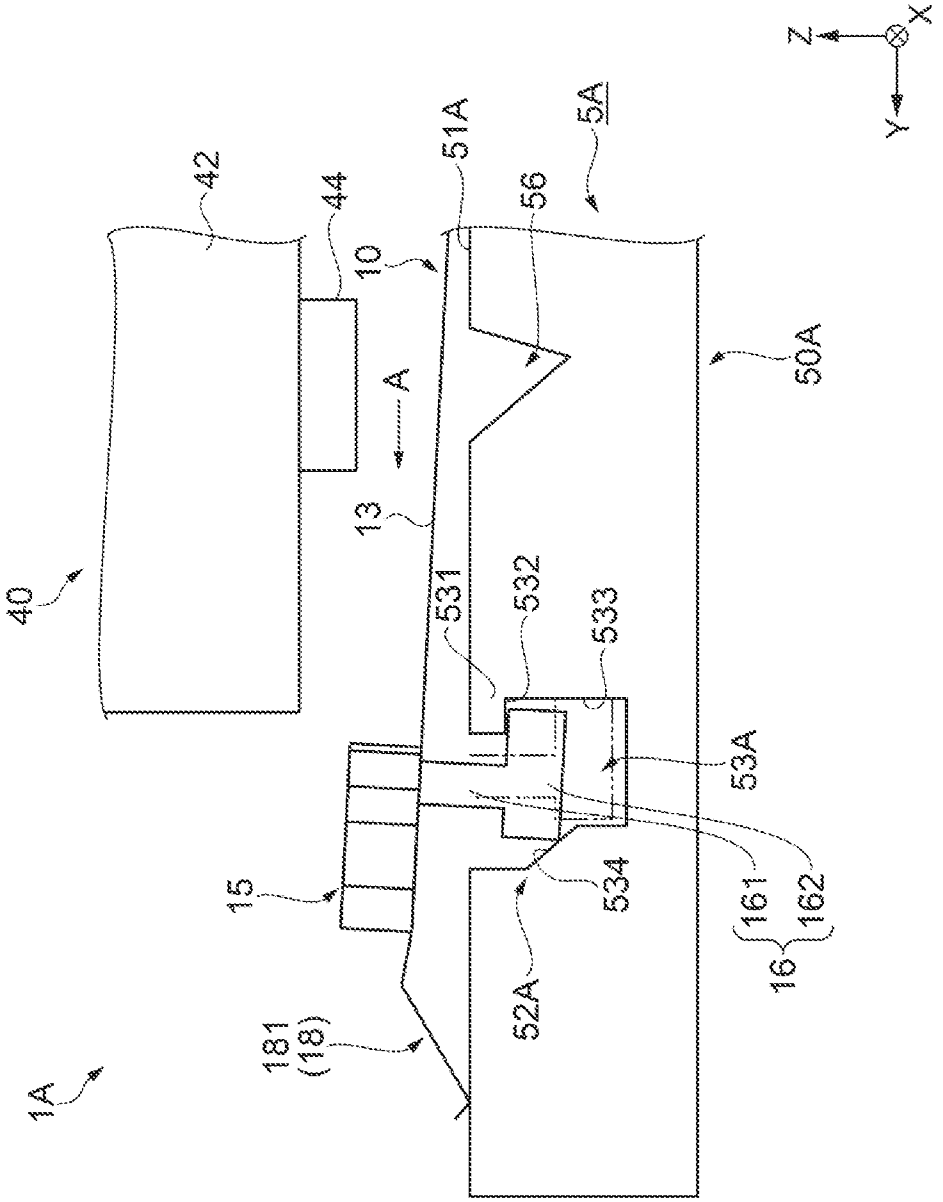
FIG. 8 is a cross-sectional view illustrating a first guide rail in a second exemplary embodiment.

FIG. 8 is cross-sectional view illustrating a first guide rail 52A in the present exemplary embodiment. In FIG. 8, the two-dot chain line indicates a case in which the abutting portion 16 is at the abutting position, and the solid line indicates a case in which the abutting portion 16 is at the separation position. Note that, in FIG. 8, the constituent portions similar to those in the first exemplary embodiment are denoted with the similar reference symbols.

With reference to FIG. 8, an operation of the abutting portion 16 in the first guide rail 52A is described.

As illustrated in FIG. 8, the first guide rail 52A in the present exemplary embodiment is different from the first guide rail 52 in the first exemplary embodiment in a cross-sectional shape of a first groove 53A. The first groove 53A in the present exemplary embodiment is different from the first groove 53 in the first exemplary embodiment in a shape of a side surface of the first groove 53A in the +Y direction, which corresponds to an inner wall of the first groove 53A.

Specifically, an inclination surface 534 is formed on the side surface in the +Y direction. The inclination surface 534 is inclined upward in the +Y direction. In other words, in the first groove 53A, a surface of the inner wall of the first guide rail 52A, which is on the side opposite to the abutting surface 533 in the transport direction A, has the inclination surface 534 inclined upward in the transport direction A.

Here, description is made on an operation for moving the medium holding unit 10 from a state in which the medium holding unit 10 is at a predetermined position.

First, a user grips the grippers 155 of the switching portion 15 so as to narrow the space therebetween. When the grippers 155 are gripped so as to narrow the space therebetween, the abutting portion 16 loses a pressing force in the −Y direction, and the end surface of the tip portion 162 in the −Y direction separates away from the abutting surface 533. In other words, the abutting portion 16 is switched from the abutting position to the separation position.

Then, due to a pressing force of the leaf spring 181, the medium holding unit 10 autonomously moves a position of the medium holding unit 10 in a direction away from a support face 51A (upward). In this case, a lower corner portion of the abutting portion 16 (the tip portion 162) in the +Y direction abuts against the inclination surface 534, and moves upward along the inclination surface 534 in a sliding manner. Further, the abutting portion 16 (the tip portion 162) abuts against the regulation portion 531 (the lower end surface 532), and hence upward movement is regulated.

According to the present exemplary embodiment, effects similar to those in the first exemplary embodiment can be exerted, and the following effects can also be obtained.

In a medium supporting mechanism 5A according to the present exemplary embodiment (the first groove 53A), the surface of the inner wall of the first guide rail 52A, which is on the side opposite to the abutting surface 533 in the transport direction A, has the inclination surface 534 inclined upward in the transport direction A.

With this configuration, due to a pressing force with which the pressing portion 18 presses the support face 51A when the abutting portion 16 is switched from the abutting position to the separation position, the abutting portion 16 abuts against the inclination surface 534, and slides along the inclination surface 534. With this, the medium holding unit 10 easily moves in a direction away from the support face 51A. Thus, a position of the medium holding unit 10 can further autonomously move in a direction away from the support face 51A.

3. Third Exemplary Embodiment

Figure 9:
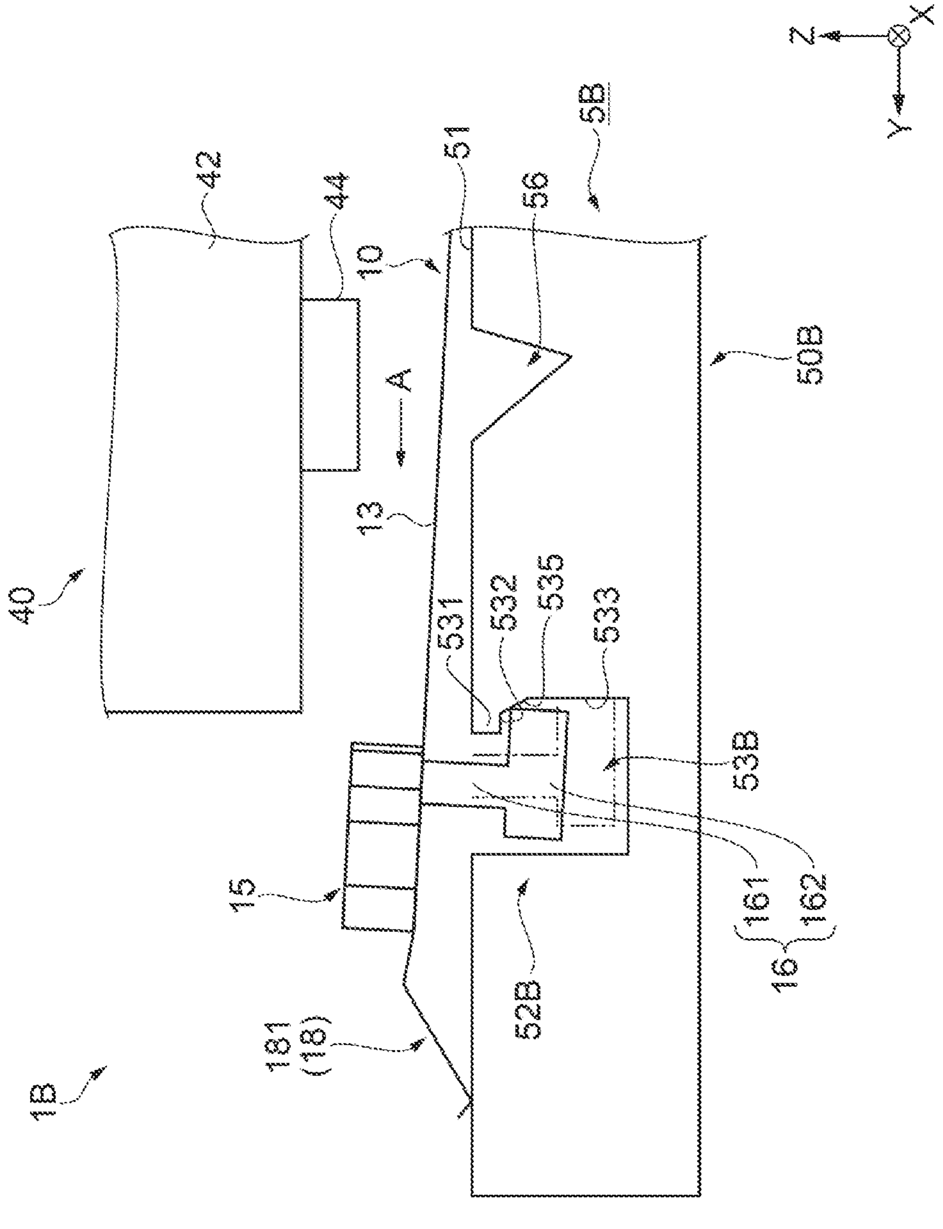
FIG. 9 is a cross-sectional view illustrating a first guide rail in a third exemplary embodiment.

FIG. 9 is cross-sectional view illustrating a first guide rail 52B in the present exemplary embodiment. In FIG. 9, the two-dot chain line indicates a case in which the abutting portion 16 is at the abutting position, and the solid line indicates a case in which the abutting portion 16 is at the separation position. Note that in FIG. 9, the constituent portions similar to those in the first exemplary embodiment are denoted with the similar reference symbols.

With reference to FIG. 9, an operation of the abutting portion 16 in the first guide rail 52B is described.

As illustrated in FIG. 9, the first guide rail 52B in the present exemplary embodiment is different from the first guide rail 52 in the first exemplary embodiment in a cross-sectional shape of a first groove 53B. The first groove 53B in the present exemplary embodiment is different from the first groove 53 in the first exemplary embodiment in a shape of a side surface of the first groove 53B in the −Y direction, which corresponds to an inner wall of the first groove 53B.

Specifically, on the side surface in the −Y direction, an inclination surface 535 is formed from the middle of the lower end surface 532 of the regulation portion 531 to the upper part of the abutting surface 533. The inclination surface 535 is inclined downward in the −Y direction. In other words, in the first groove 53B, a surface of the inner wall of the first guide rail 52B, which is on the side opposite to the transport direction A, has the inclination surface 535 inclined downward from the lower end surface 532 of the regulation portion 531 to the abutting surface 533.

Here, description is made on an operation for providing the medium holding unit 10 in the first groove 53B from a state in which the medium holding unit 10 moves to a predetermined position.

After moving the medium holding unit 10 to a predetermined position, a user presses the grippers 155, which are gripped so as to narrow the space therebetween, downward, and then stops the gripping. When a user presses the grippers 155 downward, pressing is performed against a pressing force that the pressing portion 18 exerts against the support face 51. In this case, an upper corner portion of the abutting portion 16 (the tip portion 162) in the −Y direction can abut against the inclination surface 535, and can move downward along the inclination surface 535 in a sliding manner. With this, the abutting portion 16 (the tip portion 162) can stably abut against the abutting surface 533. Further, when gripping of the grippers 155 is stopped, the abutting portion 16 (the tip portion 162) abuts against the abutting surface 533, and is fixed to the first groove 53B. In other words, the abutting portion 16 is switched from the separation position to the abutting position.

Note that an elastic force of the coil spring 154 is set to be larger than a pressing force of the pressing portion 18 (a spring force of the leaf spring 181). Therefore, even when a pressing-down force is weak, the abutting portion 16 (the tip portion 162) stably slides along the inclination surface 535, and abuts against the abutting surface 533 by stopping gripping of the grippers 155 and pressing the grippers 155 downward at a predetermined position.

According to the present exemplary embodiment, effects similar to those in the first exemplary embodiment can be exerted, and the following effects can also be obtained.

In the medium supporting mechanism 5B according to the present exemplary embodiment (the first groove 53B), the surface of the inner wall of the first guide rail 52B, which is on the side opposite to the transport direction A, has the inclination surface 535 inclined downward from the lower end surface 532 of the regulation portion 531 to the abutting surface 533.

With this configuration, when the abutting portion 16 moves from the separation position to the abutting position, the grippers 155 are pressed downward against a pressing force that the pressing portion 18 exerts against the support face 51. However, the abutting portion 16 can easily abut against the abutting surface 533 while sliding along the inclination surface 535, and hence the medium holding unit 10 can stably be provided on the support face 51.

4. First Modification Example

In the present exemplary embodiment, an ink-jet head of a serial head type is used as the ejection head 43. However, the present exemplary embodiment is not limited thereto. An ink-jet head of a line head type may be used as the ejection head 43.

5. Second Modification Example

In the present exemplary embodiment, the pressing portion 18 is configured as one leaf spring 181. However, the present exemplary embodiment is not limited thereto. The pressing portion 18 may be configured as a plurality of leaf springs. The shape of the leaf sprint is not limited to the present exemplary embodiment.

6. Third Modification Example

In the present exemplary embodiment, the pressing portion 18 is configured as the leaf spring 181. However, the present exemplary embodiment is not limited thereto. For example, the pressing portion 18 may include a displacement portion that is displaced (protrudes) toward the support face 51 by interlocking with the switching portion 15 for switching a position of the abutting portion 16 from the abutting position to the separation position. With this displacement of the displacement portion, the support face 51 can be pressed, and a position of the medium holding unit 10 can move in a direction away from the support face 51.

7. Fourth Modification Example

In the present exemplary embodiment, the second groove 54 is formed on the outer side of the region in the width direction, the region where the edge of the medium M is transported. However, the present exemplary embodiment is not limited thereto. The second groove 54 may be formed on an inner side of the region in the width direction, the region where the edge of the medium M is transported. In this case, the abutting portion 16 is only required to move while being pressed downward without coming off the second groove 54 when the abutting portion 16 moves along the first guide rail 52. With this, the medium supporting unit 50 can be reduced in size.

8. Fifth Modification Example

In the present exemplary embodiment, the second groove 54 is formed at the end of the medium supporting unit 50 in the width direction on the outer side of the region in the width direction, the region where the edge of the medium M is transported. However, the present exemplary embodiment is not limited thereto. The second groove 54 may be formed in a part on an inner side of the end of the medium supporting unit 50 in the width direction, on the outer side of the region where the edge of the medium M is transported.

9. Sixth Modification Example

In the present exemplary embodiment, the first guide rail 52 includes the second groove 54 for providing the abutting portion 16. In view of this, the second guide rail 55 may also be provided with a groove for providing the engaging portion 17, similarly to the second groove 54. In this case, there may be provided a groove in the second guide rail 55 at a position corresponding to the second groove 54. With this, the engaging portion 17 can easily be provided to the second guide rail 55.

10. Seventh Modification Example

In the present exemplary embodiment, there is provided the engaged portion that is positioned upstream of the first guide rail 52 in the transport direction A and intersects the support face 51. Note that, in the present exemplary embodiment, as an example, the second guide rail 55 having a configuration substantially similar to the first guide rail 52 is provided as an engaged portion. However, the present exemplary embodiment is not limited thereto. For example, a protrusion portion that protrudes in the −Y direction may be used as an engaged portion. When the abutting portion 16 is at the abutting position, the protrusion portion is engageable with the engaging portion 17. When the abutting portion 16 is at the separation position, the protrusion portion can cancel engagement with the engaging portion 17.

11. Eighth Modification Example

In the present exemplary embodiment, there is provided the movement assisting surface portion 575 that smoothly moves the pressing portion 18 (the leaf spring 181) from the bottom surface portion 572 of the accommodating portion 57 (the recessed portion 571) to the support face 51 in the +X direction. As illustrated in FIG. 3, the movement assisting surface portion 575 in the present exemplary embodiment is formed as an inclination surface having a predetermined inclination angle. However, the present exemplary embodiment is not limited thereto. The movement assisting surface portion 575 may be formed to have a concave shape having a constant curvature. A step-like configuration obtained by dividing the inclination surface into a plurality of steps may be adopted.

12. Ninth Modification Example

In the present exemplary embodiment, after a position of the medium holding unit 10 autonomously moves in a direction away from the support face 51 (upward) due to a pressing force of the leaf spring 181, a user moves the medium holding unit 10 in the width direction. In this case, a member having low friction adheres to or is sprayed/applied onto the surface of the base plate portion 13 of the holding portion 11, which slides (contacts) on at least a part of the support face 51. With this, sliding friction (friction resistance) may be reduced. A region of the base plate portion 13, which slides (contacts) with a part of the support face 51, may be formed of a member having a friction coefficient smaller than that in a region of the base plate portion 13, which does not contact with the support face 51.

What is claimed is:

1. A medium supporting mechanism comprising:
a medium supporting unit; and
a medium holding unit, wherein
the medium supporting unit includes
a support face supporting a medium,
a guide rail being provided, at the support face, to extend along a width direction intersecting a transport direction in which the medium is transported, and
an engaged portion being positioned upstream of the guide rail in the transport direction and intersecting the support face,
the medium holding unit includes
a holding portion covering an edge of the medium in the width direction,
an abutting portion movable between an abutting position and a separation position, the abutting position being a position at which the abutting portion presses and abuts against the abutting surface being an inner wall of the guide rail, the separation position being a position at which the abutting portion is separated away from the abutting surface,
a switching portion configured to switch a position of the abutting portion from one of the abutting position and the separation position to the other one thereof, and
an engaging portion configured to engage with the engaged portion, and
the medium holding unit includes a pressing portion downstream of the abutting portion in the transport direction, the pressing portion being configured to press the support face to move a position of the holding portion in a direction away from the support face.

2. The medium supporting mechanism according to claim 1, wherein
the pressing portion is formed of a leaf spring.

3. The medium supporting mechanism according to claim 1, wherein
the abutting portion includes a base coupled to the holding portion and a tip portion continuous to the base,
a first length of the base in the transport direction is shorter than a second length of the tip portion in the transport direction,
the guide rail includes
a first groove including a gap longer than the first length and shorter than the second length in plan view of the support face and being configured to guide the abutting portion in a movable manner in the width direction and
a second groove for installing the abutting portion, the second groove including a gap that is continuous to the first groove in the width direction and longer than the second length in plan view of the support face, and
the first groove includes a regulation portion for preventing the tip portion from coming off the guide rail.

4. The medium supporting mechanism according to claim 3, wherein
the second groove is formed, in the width direction, on an outer side of a region where the edge of the medium is transported.

5. The medium supporting mechanism according to claim 1, wherein
the medium supporting unit is provided with an accommodating portion accommodating the pressing portion.

6. The medium supporting mechanism according to claim 1, wherein
of the inner wall of the guide rail, a surface opposite to the abutting surface in the transport direction includes an inclination surface inclined upward with respect to the transport direction.

7. A printing apparatus comprising:
a printing unit configured to perform printing on a medium; and
a medium supporting mechanism configured to support the medium, wherein
the medium supporting mechanism includes
a medium supporting unit and
a medium holding unit,
the medium supporting unit includes
a support face supporting a medium,
a guide rail being provided to extend along a width direction intersecting a transport direction in which the medium is transported, and
an engaged portion being positioned upstream of the guide rail in the transport direction and intersecting the support face,
the medium holding unit includes
a holding portion covering an edge of the medium in the width direction,
an abutting portion movable between an abutting position and a separation position, the abutting position being a position at which the abutting portion presses and abuts against the abutting surface being an inner wall of the guide rail, the separation position being a position at which the abutting portion is separated away from the abutting surface,
a switching portion configured to switch a position of the abutting portion from one of the abutting position and the separation position to the other one thereof, and an engaging portion configured to engage with the engaged portion, and the medium holding unit includes a pressing portion downstream of the abutting portion in the transport direction, the pressing portion being configured to press the support face to move a position of the holding portion in a direction away from the support face.

* * * * *